(12) United States Patent
Stipe et al.

(10) Patent No.: US 7,405,011 B2
(45) Date of Patent: Jul. 29, 2008

(54) MAGNETIC RECORDING MEDIA FOR TILTED RECORDING

(75) Inventors: Barry Cushing Stipe, San Jose, CA (US); Jan-Ulrich Thiele, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 471 days.

(21) Appl. No.: 10/882,881

(22) Filed: Jun. 30, 2004

(65) Prior Publication Data

US 2006/0002026 A1 Jan. 5, 2006

(51) Int. Cl.
*G11B 5/66* (2006.01)
(52) U.S. Cl. .................................. 428/831.2
(58) Field of Classification Search .......... 428/831.2, 428/832, 832.1
See application file for complete search history.

(56) References Cited

U.S. PATENT DOCUMENTS

| | | | |
|---|---|---|---|
| 5,605,733 | A | 2/1997 | Ishikawa et al. |
| 6,007,623 | A | 12/1999 | Thiele et al. |
| 6,524,730 | B1 | 2/2003 | Chen |
| 6,531,202 | B1 | 3/2003 | Litvinov et al. |
| 7,092,209 | B2 * | 8/2006 | Hsiao et al. ............ 360/135 |
| 2001/0033949 | A1 | 10/2001 | Abarra et al. |
| 2002/0098381 | A1 | 7/2002 | Coffey et al. |
| 2002/0098390 | A1 | 7/2002 | Do et al. |
| 2004/0106009 | A1 | 6/2004 | Nakamura et al. |

OTHER PUBLICATIONS

T. Oikawa, et al., "Microstructure and Magnetic Recording Properties of CoPtCr-SiO$_2$ Perpendicular Recording Media", IEEE Transactions on Magnetics, vol. 38, No. 5, Sep. 2002, pp. 1976-1978.
Kai-Zhong Gao and H. Neal Bertram, "Magnetic Recording Configuration for Densities Beyond 1 Tb/in$^2$ and Data Rates Beyond 1 Gb/s", IEEE Transactions on Magnetics, vol. 38, No. 6, Nov. 2002, pp. 3675-3683.

(Continued)

*Primary Examiner*—Holly Rickman
(74) *Attorney, Agent, or Firm*—G. Marlin Knight

(57) ABSTRACT

A recording medium according to the invention has a magnetic recording layer with an $L1_0$ magnetic material deposited with a (111) preferred orientation and soft underlayer (SUL). One set of embodiments includes an intermediate layer (seed layer or underlayer) between the $L1_0$ media and SUL. The intermediate layer can be a close-packed surface structure (triangular lattice) to promote (111) orientation of the $L1_0$ media. For example, the intermediate layer can be a (111) oriented, face-centered-cubic (fcc) material such as platinum, palladium, iridium, rhodium, FePt, FePd, or FePdPt alloys; or the intermediate layer can be a (100) oriented hexagonal-close-packed (hcp) material such as ruthenium, rhenium, or osmium. Alternatively, the intermediate layer can be an amorphous material. The $L1_0$ recording layer of the invention can be deposited with a matrix material to form grain boundaries and provide magnetic isolation of the grains of $L1_0$ material.

13 Claims, 3 Drawing Sheets

OTHER PUBLICATIONS

Jae-Yoon Jeong, et al., "Controlling the Crystallographic Orientation in Ultrathin $L1_0$FePt (111) Films on MgO (111) Underlayer," IEEE Transactions on Magnetics, vol. 37, No. 4, Jul. 2001, pp. 1268-1270.

J. S. Chen, et al., "Effect of Pt buffer layer on structural and magnetic properties of FePt thin films" *J. Appl. Phys.*. vol. 93, pp. 1631-1665, Feb. 1, 2003.

C. Chen, et al, "Long-range atomic ordering and magnetic properties of $Co_{1-x}Pt_xSiO_2$ granular films" *J. Appl. Phys.*. vol. 87, No. 9, pp. 6947-6949, May 1, 2000.

H. Zeng, et al. "Orientation-controlled nonepitaxial $L1_0$ CoPt and FePt films" *Appl. Phys.* Let., vol. 80, pp. 2350-2352, Apr. 1, 2002.

K. Z. Gao, et al. "Transition jitter estimates in tilted and conventional perpendicular recording media at I $Tb/in_2$," *IEEE Trans- Mag.*, vol. 39., No. 2, pp. 704-709, Mar. 2003.

H. N. Bertram, et al. "SNR and density limit estimates: A comparison of longitudinal and perpendicular recording", *IEEE Trans. Mag.*, vol. 36, No. 1, pp. 4-9, Jan. 2000.

D. Weller, et al. "High Ku materials approach to 100 Gbits/$in^2$" *IEEE Trans. Mag.*, vol. 38, No. 6, pp. 10-15. Jan. 2000.

\* cited by examiner

MAGNETIC RECORDING MEDIA FOR TILTED RECORDING

FIELD OF THE INVENTION

The invention relates to magnetic storage devices and magnetic recording media for magnetic recording and more particularly to thin film magnetic media with a preferred orientation of the easy axis of magnetization tilted out of the surface plane of the media.

BACKGROUND OF THE INVENTION

A typical prior art disk drive system 10 using perpendicular recording is illustrated in FIG. 1. In operation the magnetic transducer (head) 14 is supported by the suspension (not shown) as it flies above the rotating disk 16. The magnetic transducer 14, usually called a "head" or "slider," is composed of elements that perform the task of reading and writing magnetic transitions. In a disk drive using perpendicular recording the recording head is designed to direct magnetic flux through the recording layer in a direction which is perpendicular to the plane of the disk. Typically the disk 16 for perpendicular recording has thin films 21 including a hard magnetic recording layer 28 and a magnetically soft underlayer 29. During recording operations using a single-pole type head, magnetic flux is directed from the main pole of the recording head perpendicularly through the hard magnetic recording layer, then into the plane of the soft underlayer and back to the return pole in the recording head. The shape and size of the main pole and any shields are the primary factors in determining the track width. The write head portion (not shown) of head 14 uses pole piece 42.

U.S. Pat. No. 6,531,202 to Litvinov, et al. is an example of a magnetic recording medium for perpendicular or vertical recording. The medium includes a magnetically soft underlayer deposited on the substrate. Suitable soft magnetic materials are said to include CoFe and alloys thereof, FeAlN, NiFe, CoZrNb and FeTaN, with CoFe and FeAlN being preferred soft materials. A magnetically hard recording layer is deposited on the soft underlayer. Suitable hard magnetic materials for the recording layer are said to include multilayers of Co/Pd or Co/Pt, $L1_0$ phases of CoPt, FePt, CoPd and FePd and hcp Co alloys, with such multilayers and $L1_0$ phases being preferred hard materials.

In U.S. Pat. No. 6,524,730 to Ga-Lane Chen a soft magnetic underlayer for vertical recording is referred as "keeper layer". The soft underlayer is said to give better writing efficiency by pulling the magnetic flux down from the writing pole of a head of the magnetic recording medium. Examples given of soft magnetic materials are NiFe, CoZrNb, FeAlNx.

Bulk tetragonal $L1_0$ ordered phase materials (also called CuAu (I) materials), such as CoPt and FePt, are known for their high magnetocrystalline anisotropy and magnetic moment, properties that are also desirable for high-density magnetic recording media. The C-axis of the $L1_0$ phase is similar to the C-axis of hcp CoPt alloys in that both are the easy axis of magnetization. Thus, while the disordered face-centered-cubic (fcc) solid solution of Co and Pt has cubic symmetry and low magnetic anisotropy, the ordered $L1_0$ phase has uniaxial anisotropy similar to, but greater in magnitude than, hcp CoPt alloys. U.S. Pat. No. 6,007,623 to Thiele, et al., describes a method for producing a horizontal magnetic recording medium that has as its magnetic film a granular film with grains of a chemically-ordered FePt or FePtX (or CoPt or CoPtX) alloy in the tetragonal $L1_0$ structure. These granular films reveal a very high magnetocrystalline anisotropy within the individual grains. The film is produced by sputtering from a single alloy target or co-sputtering from several targets. The granular structure and the chemical ordering are controlled by means of sputter parameters, e.g., temperature and deposition rate, and by the use of an etched seed layer that provides a structure for the subsequently sputter-deposited granular magnetic film. The structure of the seed layer is obtained by sputter etching, plasma etching, ion irradiation, or laser irradiation. The magnetic properties, i.e., $H_c$ and areal moment density $M_{rt}$, are controlled by the granularity (grain size and grain distribution), the degree of chemical ordering, and the addition of one or more nonmagnetic materials, such as Cr, Ag, Cu, Ta, or B. These nonmagnetic materials are partly incorporated into the grains, but mainly accumulate at the grain boundaries. The role of the nonmagnetic material is thus to "dilute" the magnetization and to decouple the magnetic exchange between the grains.

The use of $SiO_2$ with CoPtCr to enhance grain boundary formation without disrupting the epitaxy in perpendicular magnetic recording media has been described. (T. Oikawa, et al., "Microstructure and Magnetic Recording Properties of CoPtCr—$SiO_2$ Perpendicular Recording Media", IEEE Transactions on Magnetics, vol. 38, no. Sep. 5, 2002, pp. 1976-1978.)

Tilted magnetic recording is one of the leading candidate technologies for extending hard disk drive (HDD) areal density to beyond one $Tb/in^2$ and data rates beyond one Gb/s. What is needed is a manufacturable way to make high SNR media with an anisotropy direction approximately 45 degrees out of the plane of the disk surface. The head structure and basic media fabrication methods for perpendicular recording can be used with tilted media. Tilted recording devices can be expected to cost about the same as currently available technologies. Tilted recording has a number of benefits over perpendicular recording. First, the anisotropy field and magnetization of the medium can both be approximately doubled (to around $H_k$ 30 kOe and Ms=800 emu/cc) since the grains are easier to reverse for a given maximum head field. The four-fold increase in energy density means a fourfold reduction in grain volume without thermal stability problems. Second, switching field variations due to the distribution in anisotropy angle are up to 10 times smaller for tilted recording. This results in much sharper bit transitions and higher bit density. Third, the guard band between tracks is much smaller for tilted recording because the switching field and energy barrier increase for the larger write field angles at the track edge. Fourth, tilted recording is capable of much higher data rates than perpendicular recording since the reversal torque is much higher. Switching times up to ten times shorter than for perpendicular recording have been reported.

Gao and Bertram have proposed using a soft underlayer with a magnetic layer with 45 degree anisotropy tilted out of the plane of the disk in conjunction with single pole heads. The anisotropy orientation can be cross-track, down-track or randomly distributed. In their theoretical paper, Gao and Bertram do not give materials or techniques for producing the hypothetical media which they analyze. (Kai-Zhong Gao and H. Neal Bertram, "Magnetic Recording Configuration for Densities Beyond 1 $Tb/in^2$ and Data Rates Beyond 1 Gb/s", IEEE Transactions on Magnetics, vol. 38, no. 6, November 2002, pp. 3675-3683.)

The use of MgO(111) underlayer to improve the crystallographic orientation of $L1_0$ FePt(111) films has been discussed by Jae-Yoon Jeong, et al. The FePt was deposited at a temperature of 300° C. and then annealed 400°-500° C. for one hour. (Jae-Yoon Jeong, et al., "Controlling the Crystallographic Orientation in Ultrathin $L1_0$FePt (111) Films on MgO(111) Underlayer," IEEE Transactions on Magnetics, vol. 37, no. 4, July 2001, pp. 1268-1270.

SUMMARY OF THE INVENTION

A recording medium according to the invention has a magnetic recording layer with a recording layer of an $L1_0$ magnetic material deposited with a (111) preferred orientation and soft underlayer (SUL). One set of embodiments includes an intermediate layer (seed layer or underlayer) between the $L1_0$ media and SUL. The intermediate layer can be a close-packed surface structure (triangular lattice) to promote (111) orientation of the $L1_0$ media. For example, the intermediate layer can be a (111) oriented, face-centered-cubic (fcc) material such as platinum, palladium, iridium, rhodium, FePt, FePd, or FePdPt alloys; or the intermediate layer can be a (100) oriented hexagonal-close-packed (hcp) material such as ruthenium, rhenium, or osmium. Alternatively, the intermediate layer can be an amorphous material.

The $L1_0$ recording layer of the invention can be deposited with a matrix material such as $SiO_x$, carbon (C), boron (B), boron nitride (BN), boron carbide (BC), CN, SiN, SiC, yttrium stabilized zirconia (YSZ), $AlO_x$, or $MgO_x$ to form grain boundaries and provide magnetic isolation of the grains of $L1_0$ material. The matrix material forming the grain boundaries is preferably approximately 1 nm thick. Alternatively, Cr, Ag, Au, Cu, Ta, or B may be deposited with the $L1_0$ recording layer. As mentioned previously, these nonmagnetic materials are partly incorporated into the grains, but mainly accumulate at the grain boundaries. The role of the nonmagnetic material is thus to "dilute" the magnetization and to decouple the magnetic exchange between the grains.

Optionally, the media of the invention can include a mechanically textured (scratched) substrate to promote orientation of the in-plane component of the media magnetization vector into the in-track or cross-track direction. The preferred method of depositing the $L1_0$ material uses an elevated temperature between 200° and 600° C. A high temperature glass-ceramic substrate can be used.

An embodiment of the $L1_0$ recording layer includes a tetragonal AB material with approximately equiatomic amounts of A and B and A=((Co and/or Fe) and optional Ni, Mn, Cu) and B=(Pt and/or Pd) with a magnetic easy axis 36 degrees out the plane of the film.

DETAILED DESCRIPTION OF THE INVENTION AND THE PREFERRED EMBODIMENTS

A write head generating a perpendicular write field can be used with the media according to the invention. A soft underlayer (SUL) is used with the tilted recording layer to aid the writing process in a manner similar to perpendicular recording in combination with a pole head to apply perpendicular fields. Materials suitable for the tilted recording layer include CoPt or FePt with possibly Mn, Ni, or Cu partially substituted for Co or Fe, and/or Pd partially or fully substituted for Pt. In one set of embodiments the recording layer has a tilt angle of 36 degrees out of plane with 2D random in-plane vector.

Materials such as FePt and CoPt appear to be ideal candidates for tilted recording due to their very high anisotropy, high magnetization, and fct structure with c-axis in the (100) direction. The fct structure is an fcc structure slightly compressed in the (100) direction (typically about 3%). This means that a (111) textured $L1_0$ film is tilted at a fixed out-of-plane angle of about $\arcsin[(1/3)^{1/2}] = 35$ degrees (with the fct compression along the (100) direction this increases to about 36 degrees). When $L1_0$ media is deposited at very high temperature (or post annealed at very high temperature) and is sufficiently thick, it usually orients on amorphous substrates with (111) texture. It has also recently been shown that (100) texture can be achieved (for perpendicular recording) on amorphous substrates under the right conditions or when a matrix material is used to isolate the grains. However, it is desirable to be able to reliably grow $L1_0$ media with (111) texture, at lower temperature, and with a matrix material. Reliable (111) textured $L1_0$ media can best be achieved by epitaxial growth on a seed layer. Recently, (111) textured $L1_0$ FePt media has been achieved with the use of an oxide seed layer (MgO) with (111) texture using a special reactive sputtering process for the purpose of longitudinal recording. Ideally, it would be preferable to use an easily deposited metal seed layer as has been done with (100) oriented $L1_0$ films and state-of-the-art perpendicular media. Previously the use of a Pt or Pd seed layer with (111) texture for growth of $L1_0$ media for longitudinal recording has been disclosed. Preferably the grains should be separated with a matrix material like $SiO_x$.

Figure 1:
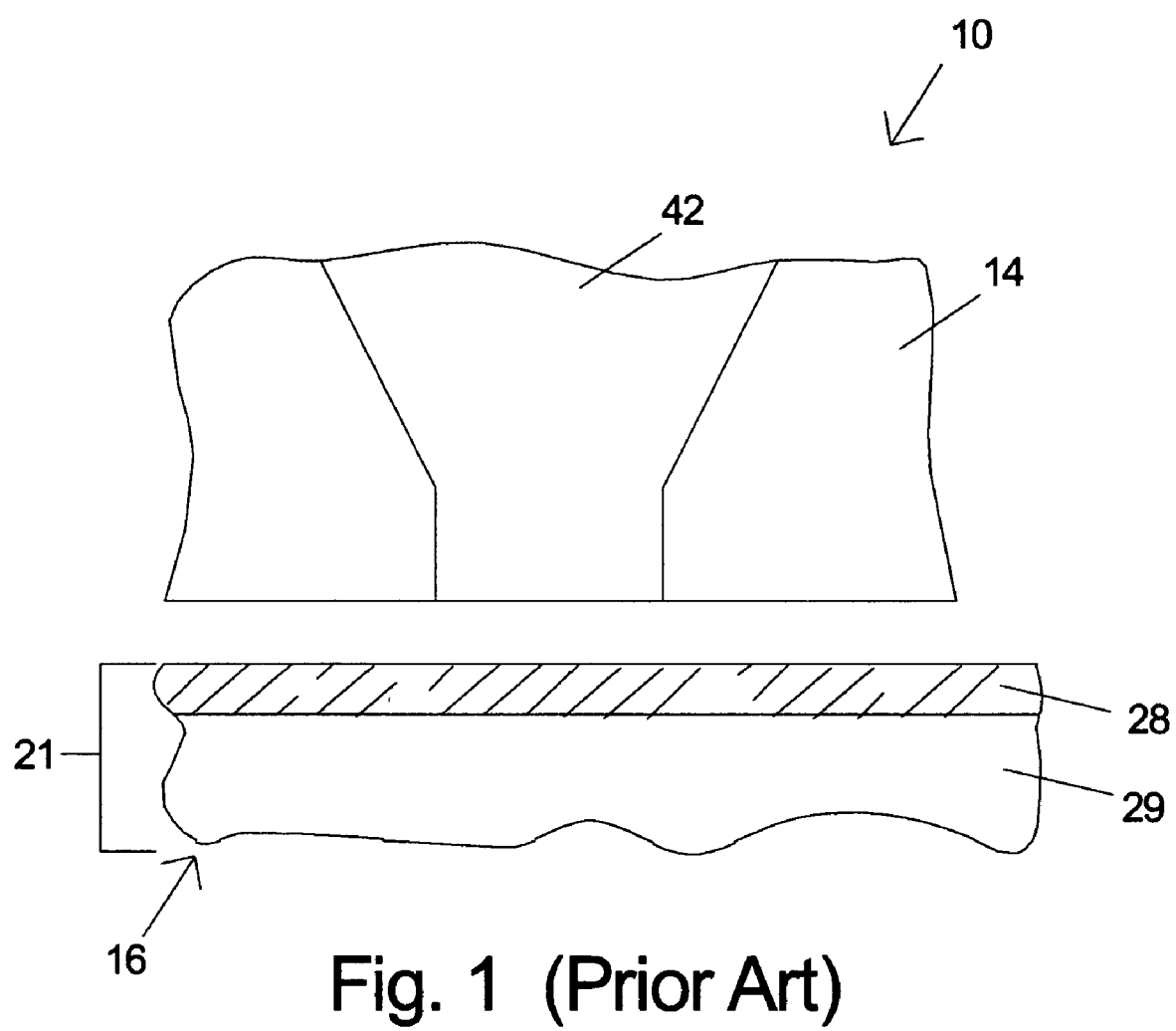
FIG. 1 is a symbolic illustration of selected components of a prior art disk drive using perpendicular recording.
Figure 2:
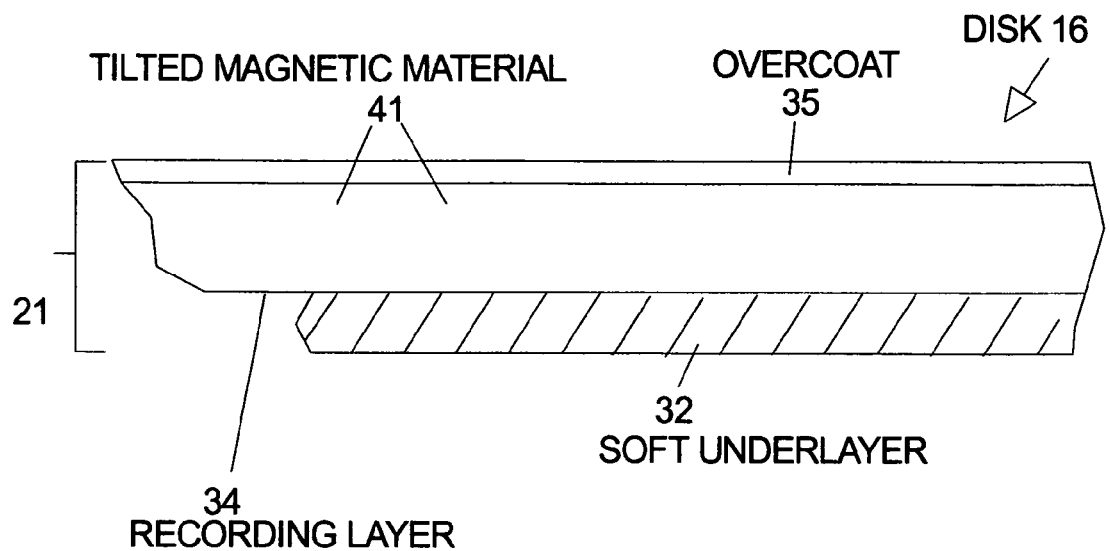
FIG. 2 is an illustration of section of a thin film disk according to an embodiment of the invention taken perpendicular to the plane of the thin films which includes a tilted recording layer and an SUL.

A first embodiment of the invention is illustrated in FIG. 2 which shows a section of the thin films 21 on a disk 16 for according to an embodiment of the invention. The recording layer 34 comprises (111) oriented, granular $L1_0$ magnetic material 41 deposited over a soft underlayer (SUL) 32 for the purpose of tilted recording with a perpendicular write field. The magnetic properties of the recording layer 34 are selected to provide an easy axis of switching (anisotropy) which is tilted out of the plane of the thin films on the surface of the disk. The magnetic easy axis of the magnetic material is approximately 36 degrees out the plane of the film. The thicknesses of the films in the drawings are not according to scale. The actual thicknesses can be determined according to the prior art except where noted herein. Preferably the $L1_0$ recording layer thickness is less than 20 nm and the distance between the bottom of the $L1_0$ media and top of the SUL is less than 20 nm. The average grain size in the plane of the film is between 2 nm and 8 nm. The deposition of the $L1_0$ magnetic material 41 is preferably at an elevated temperature between 200 and 600 C. A high temperature glass-ceramic substrate (not shown) for the disk is also preferable.

The granular (111) oriented $L1_0$ can be a tetragonal AB material with approximately equiatomic amounts of A and B where:

A=((Co and/or Fe) and optional Ni, Mn, Cu) and
B=(Pt and/or Pd).

The elements such as Ni, Mn and Cu can optionally be included to reduce the coercivity.

As is known in the art, the Co and Fe atoms are arranged in an atomic plane and alternate with atomic planes of Pt in a chemically ordered fashion (so that Co and Fe atoms comprise about 50% of the film and Pt the other 50%). These planes are perpendicular to the (100) direction. As is known in the art, the Pt may be substituted in part or in whole with Pd to tune the magnetic properties. The Co or Fe (or CoFe) may be substituted in part with Mn, Ni, or Cu to tune the magnetic properties. For example, the tilted layer may be composed of fct $Fe_{50}Pd_{25}Pt_{25}$ material deposited at an elevated temperature to promote growth of the chemically ordered phase. The soft underlayer (SUL) 32 is made of a magnetically soft material. Many soft magnetic materials are known and can serve as the underlayer. One example is NiFe (permalloy) which is used extensively in magnetic recording heads. A conventional overcoat 35 can be used. Optionally, a circumferentially polished or mechanically textured (scratched) substrate can be used to promote orientation of the in-plane component of the media magnetization vector into the in-track or cross-track direction. Other known methods for introducing anisotropic stress such as deposition at an angle can be used.

Figure 3:
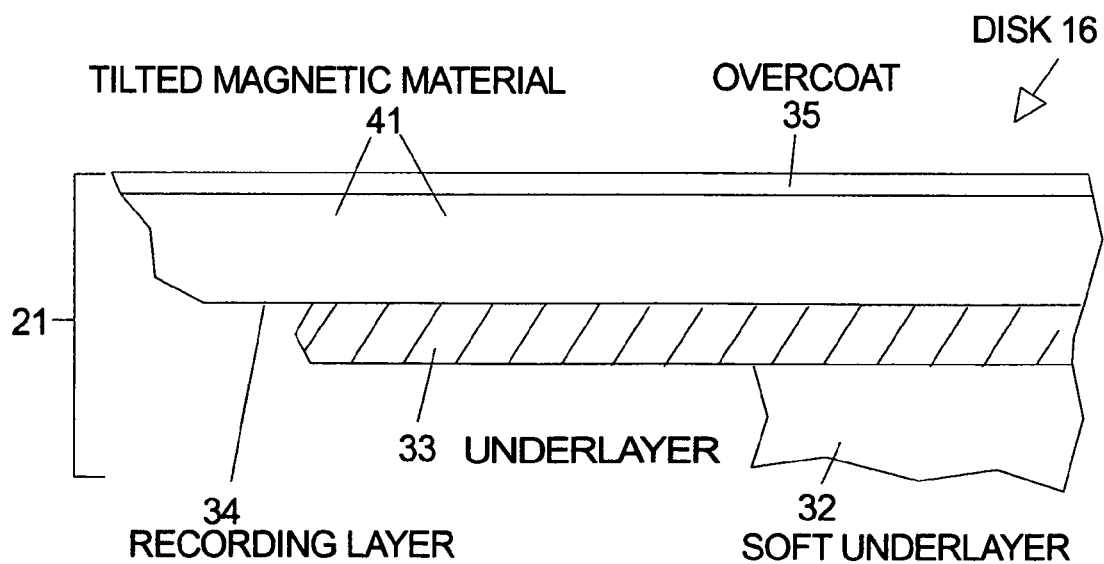
FIG. 3 is an illustration of section of a thin film disk according to an embodiment of the invention taken perpendicular to the plane of the thin films which includes a tilted recording layer, an intermediate layer and an SUL.

A second embodiment of the invention is illustrated in FIG. 3 which shows a section of the thin films 21 on a disk 16 with an intermediate layer 33 deposited between the recording layer 34 and SUL 32. The intermediate layer material is chosen to have close lattice matching to the $L1_0$ film. In one embodiment the invention includes a lattice-matched fcc metal layer with (111) texture as an intermediate layer for epitaxial $L1_0$ tilted media. For example, CoPt has a-axis lattice constant of 3.80 angstroms and c-axis lattice constant of 3.68 angstroms while FePt has a=3.85 angstroms and c=3.71 angstroms. Fcc metals that are well lattice-matched include platinum (a=c=3.92 angstroms), palladium (a=c=3.89 angstroms), iridium (a=c=3.84 angstroms), and rhodium (a=c=3.80 angstroms). Alternatively, hcp metals with (100) texture have a triangular close-packed surface structure and can also be used to establish the epitaxy for (111) oriented $L1_0$ tilted media. For example, ruthenium, rhenium, and osmium have "effective" lattice constants for overlayer growth of 3.82, 3.90, and 3.87 angstroms, respectively. The intermediate layer 33 is preferably either:

a) a (111) oriented fcc material such as platinum, palladium, iridium, rhodium, FePt, FePd, and FePdPt alloys etc.; or
b) a (100) oriented hcp material such as ruthenium, rhenium, or osmium. etc.; or
c) amorphous intermediate layer such as $SiO_x$.

Use of the (111) oriented fcc material such as FePt, FePd and FePdPt alloys etc. for the intermediate layer 33 optionally allow the same alloy to be used for both the recording layer 34 and the intermediate layer 33. The intermediate layer will be an fcc structure while the recording layer will be an fct structure. Use of matching materials in the recording layer 34 and the intermediate layer 33 provides the optional benefit of reducing the effects of any mixing between the layers. The fcc intermediate layer could be deposited at room temperature. As an example, an fct $Fe_{50}Pd_{25}Pt_{25}$ material for the recording layer can be grown on top of an fcc $Fe_{50}Pd_{25}Pt_{25}$ intermediate layer. The two layers would be very closely matched in lattice spacing. The fcc $Fe_{50}Pd_{25}Pt_{25}$ intermediate layer could be deposited at a temperature low enough to prevent the fct structure from forming. The fct recording layer is deposited with the disk at elevated temperature. At sufficiently high temperature an fcc structure can transform to fct, but the temperature required to grow the fct structure for magnetic material will not necessarily be high enough to transform the existing fcc structure of the intermediate layer. Also, if the compositions of the layers are similar, one would expect any atomic interdiffusion between the layers to have little effect on the magnetic properties of the recording layer. Fcc material with a composition similar to the fct recording layer typically has soft magnetic properties and could act an extension of the SUL. This reduces the effective distance between the write head and the SUL, which increases write resolution.

There may be more than one intermediate layer. Fcc and hcp layers will typically be polycrystalline. Grains would preferably be nearly equal in size. Also the tilted recording layer grains may or may not grow epitaxially onto grains in the intermediate layer in a one-to-one fashion.

An amorphous intermediate layer 33 such as $SiO_x$ can also be used to remove the epitaxial influence of the SUL. An amorphous material will serve as an exchange break layer between the SUL and tilted recording layer without serving as an epitaxial seed layer. Since tilted material can be grown directly on glass, the use of amorphous intermediate layer 33 can replicate this growth condition.

Optionally, the use of a textured substrate can compress the intermediate layer in an anisotropic fashion and promote orientation of the in-plane component. Most reports on tilted recording assume the media is tilted in a fixed cross-track direction. This is mainly done for simplicity to compare with perpendicular recording. However, it has been reported that some aspects of the recording performance can be further improved if the axis tilt can vary randomly between only two directions—from OD to ID and from ID to OD. There have also been theoretical studies where the in-plane tilt direction is 2D random. In all cases, SNR is predicted to be much higher than for perpendicular recording with a 10 dB improvement for the single crystal tilted media and 7.5 dB improvement for the 2D random tilted media (assuming 5 degree variations in out-of-plane angle in both cases). This appears to be roughly consistent with calculations for longitudinal recording which compare 2D random orientation with perfect orientation and show about a 3 dB difference. It can be expected that the DC noise caused by in-plane orientation variations will be smaller than the transition noise and most of the benefit of tilted media can be realized in the 2D random case. However, it appears that there is some benefit to orienting the in-plane direction and there is a preference in the literature for the cross-track direction. Optionally, the use of a textured substrate may compress the intermediate layer in an anisotropic fashion and promote orientation of the in-plane component in the overlayer. For example, mechanically textured substrates usually promote more compression in the groove direction than against the groove because there is more surface area and "room" in the cross groove direction. The compression anisotropy is typically about 0.5%. In the $L1_0$ tilted recording layer, which has a compression projected into the (111) plane of about 2%, the compressed intermediate layer may favor the growth of the (100) tilt direction that is closest to the groove direction. If hcp and fcc hollow sites in the intermediate layer are both used for the overlayer growth, then there will be six possible directions for the tilt angle and the nearest tilt direction will be at most 30 degrees from the preferred direction. It is also possible that the compression anisotropy will favor tilt in the cross groove direction depending on the lattice matching. This may be preferred since it is desirable for the groove direction to be parallel with the track direction and cross-track tilt orientation may have higher SNR than in-track tilt orientation.

Figure 4:
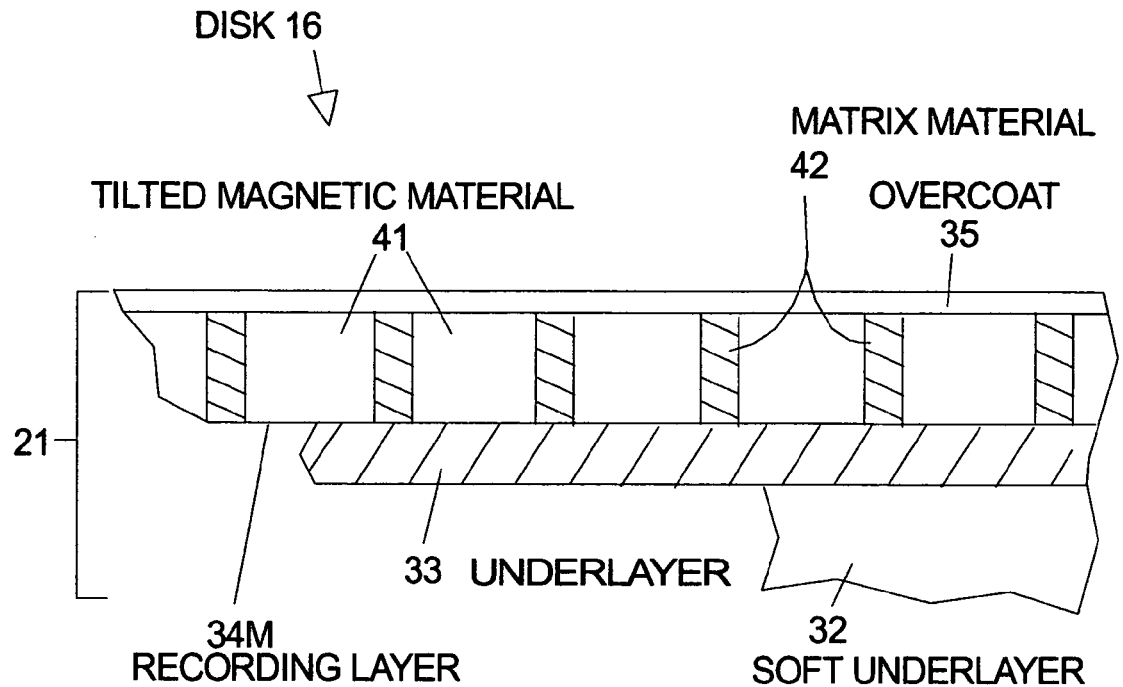
FIG. 4 is an illustration of section of a thin film disk according to an embodiment of the invention taken perpendicular to the plane of the thin films which includes a tilted recording layer with a matrix material, an intermediate layer and an SUL.

A third embodiment of the invention is illustrated in FIG. 4 which shows a section of the thin films 21 on a disk 16 with a recording layer 34M, an intermediate layer 33, and SUL 32. Recording layer 34M includes matrix material 42 which forms grain boundaries. The recording layer 34M is formed by co-deposition of grain boundary material with the tilted magnetic material 41. The materials will self-segregate during the deposition process and the result is magnetic isolation of the grains of $L1_0$ material by the matrix material. For example Si and O may be co-deposited to form amorphous $SiO_x$ matrix material between the $L1_0$ grains. The matrix material serves to reduce intergrain coupling. Preferably the grain boundary material is approximately 1 nm thick. Other dopants such as Cr, Ag, Au, Cu, Ta, or B may be added to the recording layer which tend to arrange themselves at grain boundaries and reduce intergrain coupling. Other materials that can also be co-deposited to form amorphous material between grains include carbon (C), boron (B), boron nitride (BN), boron carbide (BC), CN, SiN, SiC, yttrium stabilized zirconia (YSZ), $AlO_x$, or $MgO_x$.

Figure 5:
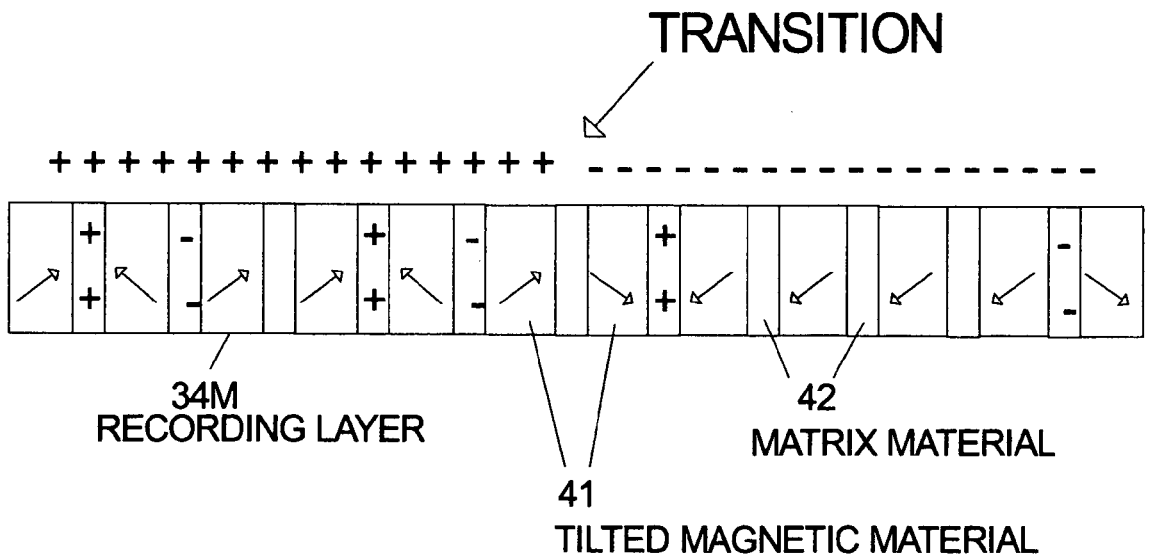
FIG. 5 is an illustration of section of the tilted recording layer according to an embodiment of the invention taken perpendicular to the plane of the thin films which is used to explain the magnetization of domains in the recording layer.

FIG. 5 will be used to illustrate magnetic transitions during a write process. FIG. 5 symbolically shows a cross section of the recording layer 34M of tilted media disk through the center of a written track. The arrows represent the magnetization directions of the grains in the tilted recording layer. Although these directions are approximately 36 degrees from the plane of the film (due to roughness of the substrate and other imperfections, the out-of-plane angle can vary by a few degrees), many possibilities exist for the in-plane direction. In the most general case, the in-plane component of the magnetization would be random from grain to grain. Alternatively, if the film can be textured in such a way to promote grain growth in the in-track axis direction, then the up-oriented grains will tend to tilt either in the down-track direction or up-track direction (this is the case shown in FIG. 5). This is known as a bi-crystal tilted media in the art. The bi-crystal may also be oriented in the cross-track direction. If tilted media can be grown to promote c-axis growth in a single direction, the media is known as single crystal tilted media. In FIG. 5, plus signs indicate positive magnetic charge and negative signs indicate negative magnetic charge. For example, the write head can orient the media in the up direction within a domain so that positive magnetic charge is at the top of the grains, and in the down direction within another domain so that negative magnetic charge is at the top of the grains. Between these domains is a transition that is sensed by the read element of the magnetic head and represents stored digital information. For single crystal tilted media, grains within a domain will have positive magnetic charge on the sides of the grains aligned next to negative magnetic charge on the sides of adjacent grains. Because the positive and negative charge are very close together, they will have a tendency to cancel and create little net magnetic field. However, for bi-crystal and 2D random tilted media, side wall charge will often not cancel and there will be a random magnetic field pattern from side wall charge creating DC noise in the read head. However, even with this extra source of noise, tilted media is expected to offer significant advantages over perpendicular media.

A thin film disk according to the invention can be fabricated using standard thin film fabrication techniques. The invention has been described with respect to particular embodiments, but other uses and applications for the materials, methods and structures according to the invention will be apparent to those skilled in the art.

The invention claimed is:

1. A tilted magnetic recording medium comprising:
a magnetically soft underlayer;
a magnetic layer including an $L1_0$ magnetic material with a (111) orientation above the magnetically soft underlayer, the magnetic material having an easy axis of switching which is tilted at an oblique angle from a planar surface on which the magnetic material is deposited, the magnetic layer including matrix material at grain boundaries which isolates grains of the $L1_0$ magnetic material; and
an intermediate layer with a (111) oriented fcc structure between the $L1_0$ magnetic material and the magnetically soft underlayer.

2. A tilted magnetic recording medium comprising:
a magnetically soft underlayer;
a magnetic layer including an $L1_0$ magnetic material with a (111) orientation above the magnetically soft underlayer, the magnetic material having an easy axis of switching which is tilted at an oblique angle from a planar surface on which the magnetic material is deposited, the magnetic layer including matrix material at grain boundaries which isolates grains of the $L1_0$ magnetic material; and
an intermediate layer between the $L1_0$ magnetic material and the magnetically soft underlayer, wherein the intermediate layer has a close-packed surface structure with a triangular lattice.

3. A tilted magnetic recording medium comprising:
a magnetically soft underlayer;
an intermediate layer with a (111) oriented fcc structure above the magnetically soft underlayer, the intermediate layer comprised primarily of platinum, palladium, iridium or rhodium; and
an $L1_0$ magnetic material with a (111) orientation above the intermediate layer.

4. A tilted magnetic recording medium comprising:
a magnetically soft underlayer;
an intermediate layer with a (111) oriented fcc structure above the magnetically soft underlayer, wherein the intermediate layer is an fcc alloy comprised primarily of Fe, Co, Pd, and Pt; and
an $L1_0$ magnetic material with a (111) orientation above the intermediate layer.

5. A tilted magnetic recording medium comprising:
a magnetically soft underlayer;
an intermediate layer of an (100) oriented hcp material; and
an $L1_0$ magnetic material with a (111) orientation above the intermediate layer.

6. The tilted magnetic recording medium of claim 5 wherein the intermediate layer is comprised primarily of ruthenium, rhenium, or osmium.

7. The tilted magnetic recording medium of claim 1 wherein the matrix material at grain boundaries includes $SiO_x$, carbon (C), boron (B), boron nitride (BN), boron carbide (BC), CN, SiN, SiC, yttrium stabilized zirconia (YSZ), AlO, $MgO_x$, Cr, Ag, Au, Cu, or Ta.

8. The tilted magnetic recording medium of claim 1 further comprising a circumferentially textured substrate.

9. The tilted magnetic recording medium of claim 1 further comprising a radially textured substrate.

10. The tilted magnetic recording medium of claim 1 wherein the $L1_0$ magnetic material is a tetragonal AB material with approximately equiatomic amounts of A and B and where A=(Co, Fe or CoFe) and B=(Pt, Pd or PtPd).

11. The tilted magnetic recording medium of claim 1 wherein the $L1_0$ magnetic material is a tetragonal AB material with approximately equiatomic amounts of A and B and where A=((Co, Fe or CoFe) with (Ni, Mn or Cu) and B=(Pt, Pd or PtPd).

12. The tilted magnetic recording medium of claim 1 wherein the $L1_0$ magnetic material has a material composition which is approximately equal to a material composition of the intermediate layer.

13. The tilted magnetic recording medium of claim 1 wherein the intermediate layer is magnetically soft.

* * * * *